(12) United States Patent
Sakezles

(10) Patent No.: US 7,699,615 B2
(45) Date of Patent: Apr. 20, 2010

(54) JOINT REPLICA MODELS AND METHODS OF USING SAME FOR TESTING MEDICAL DEVICES

(76) Inventor: Christopher Sakezles, 2522 Trailmate Dr., Sarasota, FL (US) 34243

( * ) Notice: Subject to any disclaimer, the term of this patent is extended or adjusted under 35 U.S.C. 154(b) by 114 days.

(21) Appl. No.: 11/610,250

(22) Filed: Dec. 13, 2006

(65) Prior Publication Data

US 2007/0166670 A1 Jul. 19, 2007

Related U.S. Application Data

(63) Continuation-in-part of application No. 11/172,575, filed on Jun. 30, 2005, now Pat. No. 7,507,092, which is a continuation-in-part of application No. 11/098,248, filed on Apr. 4, 2005, now Pat. No. 7,272,766, which is a continuation-in-part of application No. 11/050,161, filed on Feb. 3, 2005, now Pat. No. 7,427,199.

(60) Provisional application No. 60/749,971, filed on Dec. 13, 2005, provisional application No. 60/764,491, filed on Feb. 2, 2006.

(51) Int. Cl.
 *G09B 23/28* (2006.01)
(52) U.S. Cl. ..................... 434/274
(58) Field of Classification Search ................. 434/262, 434/267, 272, 274
 See application file for complete search history.

(56) References Cited

U.S. PATENT DOCUMENTS

| | | | | |
|---|---|---|---|---|
| 2,995,833 A | * | 8/1961 | Bezark | 434/274 |
| 4,433,961 A | * | 2/1984 | Chandler | 434/274 |
| 4,734,039 A | * | 3/1988 | Thompson | 434/274 |
| 4,850,877 A | * | 7/1989 | Mason et al. | 434/274 |
| 6,206,703 B1 | * | 3/2001 | O'Bannon | 434/274 |
| 6,234,804 B1 | * | 5/2001 | Yong | 434/267 |
| 6,361,729 B1 | * | 3/2002 | Strover et al. | 264/247 |
| 6,474,993 B1 | * | 11/2002 | Grund et al. | 434/262 |
| 6,695,619 B2 | * | 2/2004 | Brown-Wilkinson | 434/274 |
| 7,384,268 B2 | * | 6/2008 | Browne-Wilkinson | 434/274 |
| 2002/0098467 A1 | * | 7/2002 | Dente | 434/262 |
| 2006/0051729 A1 | * | 3/2006 | Zeeff | 434/274 |

OTHER PUBLICATIONS

The Effects of Testing Environment on the Viscoelastic Properties of Soft Tissues, Mark P. Ottensmeyer et al., ISMS 2004.
"Measuring in Vivo Animal Soft Tissue Properties for Haptic Modeling in Surgical Simulation," Iman Brouwer et al., Medicine Meets Virtual Reality 2001, J. D. Westwood et al.

* cited by examiner

*Primary Examiner*—Kurt Fernstrom
(74) *Attorney, Agent, or Firm*—Timothy H. Van Dyke; Beusse Wolter Sanks Mora & Maire

(57) ABSTRACT

Disclosed herein are joint replica models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

5 Claims, 7 Drawing Sheets

JOINT REPLICA MODELS AND METHODS OF USING SAME FOR TESTING MEDICAL DEVICES

CROSS-REFERENCE TO RELATED APPLICATIONS

This application is a continuation in part application to U.S. patent application Ser. No. 11/172,575; filed Jun. 30, 2005 now U.S. Pat. No. 7,507,092; which is a continuation in part application to U.S. patent application Ser. No. 11/098, 248; filed Apr. 4, 2005 now U.S. Pat. No. 7,272,766, which is a continuation in part application to U.S. patent application Ser. No. 11/050,161, filed Feb. 3, 2005 now U.S. Pat. No. 7,427,199. This application is also related to U.S. Provisional Application Nos. 60/749,971 and 60/764,491; filed Dec. 13, 2005 and Feb. 2, 2006, respectively. This application claims the benefit of priority to foregoing under 35 USC §§ 119 and 120, and the teachings of such applications are hereby incorporated herein.

BACKGROUND OF THE INVENTION

During the development of any new medical device, various tests may be required, including the characterization of physical properties (geometric, mechanical, electrical, electromagnetic, thermal, chemical, etc), the evaluation of overall device performance (numerical simulation or simulated use testing), or testing to determine the effect of the device on living tissues. These development tests may be broadly classified as either biological tests, theoretical tests, or physical tests, although there are areas where these testing classes overlap one another.

Biological testing generally involves an analysis of the interaction between the device and human or animal tissues. The biological tests that are performed first are generally biocompatibility tests, which evaluate the tendency of the device to cause damage to living tissues by mere presence of the materials comprising the device. Later on in the development cycle, the device may be tested in a live animal (animal study) or a human patient (clinical trial) to determine the ability of the device to perform its intended use and to evaluate safety and efficacy (device performance). Animal studies represent a special type of test known as simulated use testing, so called because the animal is a simulation of the actual use (human) environment.

Theoretical or computational tests may include finite element analysis, kinematic analysis, and computational fluid dynamics. These tests employ knowledge of the physical properties (strength, mass, density, viscosity, etc) of the device and actual use environment to construct a computer model of the device—tissue system. This type of model may then be used to predict device performance, the tendency of the device to fail, and possibly the tendency of the device to cause injury. Of course, these models are limited by the assumptions made in their derivation and the computational power of the computer. Unfortunately, it may be difficult to quantitatively describe a device, and more importantly the actual use environment, in sufficient detail to yield realistic results.

Physical testing essentially evaluates the design of the device. That is, this physical testing may involve; (1) the measurement of device geometry such as lengths, diameters, and wall thicknesses, (2) the measurement of mechanical properties such as tensile strength and stiffness, (3) the measurement of other device characteristics such as color, thermal conductivity, dielectric properties or other properties, or (4) simulation testing involving trial use of the device in some model of the actual use environment. The purpose of this simulation testing is to evaluate the safety (tendency to injure) and efficacy (performance characteristics) of the device, and in general to evaluate the ability of the device to perform it's intended use. As previously stated, animal studies are one important form of simulation test. Other vehicles (the simulated environment) for this type of testing include cadavers (both human and animal) and benchtop fixtures, which are man-made representations of a particular target anatomy.

The new FDA quality system regulation (QSR) now requires testing under simulated or actual use conditions for all nonexempt Class II and Class III medical devices. Not all manufacturers perform actual use (human clinical trial) testing for every medical device, so in these cases simulation testing is definitely a requirement. At least four traditional simulation options are available to meet this requirement, each with its own advantages and drawbacks. These four general approaches (Table I) to simulation testing involve theoretical (computer) models, benchtop (physical) models, cadaver (human or animal) models, and live animal models. Once again, human subjects are also employed in the development of many medical devices, but since humans represent the actual use environment, these tests (clinical studies) are not considered simulation tests.

TABLE I

The four general approaches to simulation testing including the environment and models involved.

| Theoretical Model | Benchtop Model | Cadaver Model | Live Animal |
|---|---|---|---|
| In vitro | In vitro | In vitro | In vivo |
| Theoretical or computational model | Physical properties model | Human or animal cadaver | Animal study |

Typical medical device development schemes generally involve testing early prototypes in simple bench top test fixtures. Feedback from these tests shape the product through design revisions that are subsequently evaluated using the same model. However, since this process is iterative, as the design matures the models that are needed generally become more complex. For example, a new coronary catheter may undergo initial testing in simple plastic tubes, followed by glass models designed to mimic the size and geometry of the coronary vasculature. The product may experience a series of changes resulting from these tests until the designer is satisfied with performance, and once a certain level of confidence is achieved the testing will proceed to the next available model. In the medical device industry this model is generally a live animal.

In practice, the medical device industry typically employs one or more of the four previously mentioned (Table I) model types in simulation testing prior to seeking approval for human use (a clinical trial). Of course, common sense dictates that the model selected be representative of actual use conditions, but only the clinical trial, which is not a simulation test, fully satisfies this criteria. Unfortunately, human subjects are unavailable for use until late in the development cycle due to risk, regulatory, and ethical considerations. A live animal model has therefore traditionally been the next best choice.

Animal models are currently the gold standard of pre-clinical trial medical device simulated use testing. In fact, the quality of data produced in these studies can be very high, particularly if the proper animal model is selected, the device and protocol are well designed, and the correct number of animals is used. Designed experiments are possible and are commonly employed, but require an increase in the number of animals. These tests are also performed under physiological (for the animal) conditions. Unfortunately, these studies are expensive because of the staff and facilities required to support the work. A registered facility must be contracted to run the study and care for any animals purchased, a surgeon must be retained to perform the required procedures and to generate the study protocol, and the services of a veterinarian, anesthesiologist, and surgical aide are also required. These studies can easily exceed $100,000 in total costs, and grow even more costly as the number of animals is increased.

The inability to test prototype devices on human subjects is the reason medical device developers resort to animal studies in the first place. Still, animal models suffer from a whole range of unique problems, including the many deviations between human and animal anatomy and physiology, the confounding effects of variation between individual animals, and the unpredictability that arises from using a model that is extraordinarily complex.

Animal models may include live canine, porcine, or bovine specimens, among others. While these animals do offer an in vivo environment, their anatomy and physiology differs significantly from that of a human. The great expense and specialized facilities required limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

To get around these issues, developers tend to gravitate toward simpler and more accessible models such as cadavers and benchtop fixtures. Unfortunately, there tends to be an inverse relationship between the usefulness and complexity of the model employed. For example, cadaver tissues provide an accurate representation of anatomical geometry, but the required chemical preservation greatly alters the physical properties of the tissues. In addition, biological temperatures and flows cannot generally be simulated, subjects are difficult to source and maintain in useful quantities, and an educational institution must almost always be contracted (at considerable expense) to perform the study.

These factors drive early stage medical device developers to simple benchtop fixtures made (usually) in house by the developer. Unfortunately, these models are typically designed by individuals lacking an understanding of anatomy and physiology, and are usually fabricated from typical engineering materials such as metal, glass, and plastic. While an argument may be made that these models are better than nothing, they are certainly not representative of actual use conditions. Furthermore, engineers in general will agree that the quality of test data is dependent on the good logic behind the test protocol and the quality of the model employed. A poor model is therefore more likely to yield misleading data, and a design based at an early stage upon this data is more likely to require correction at a later stage in development.

SUMMARY

The use of a poorly conceived model in research and development testing will lead to reduced product quality, increased development costs, and greatly lengthened product timeliness Fortunately, these failures may be avoided by employing an intelligent development scheme in conjunction with a high quality model. Accordingly, the subject invention pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention may serve as a highly sophisticated bench top model that is designed to be used by medical device developers both early and late in the development process. These models mimic not only the geometry of the target anatomy, but also the physical properties of the living tissues that contact the device.

One important feature of certain embodiments of the subject invention is the implementation of synthetic analog materials that can simulate one or more physical properties of living tissues. These analogs are in most cases hydrogel materials that are designed on the basis of physical tests performed on actual living target tissues. For example, a particular analog material might be designed to exhibit a tensile strength close to 10 kPa to mimic a target tissue that exhibits a tensile strength of 10 kPa. One or more components made from these analog materials are then assembled into a configuration that mimics both the size and geometry of the target anatomical structure.

In certain embodiments, the subject invention pertains to joint replica models that comprise components made of tissue analog materials. The models may be used for development, experimentation, or training in the field of orthopedic surgical devices, and/or implant devices. In exemplary embodiments, joint replica models comprise joint structures such as cartilage, tendons, ligaments, and muscles that are made of hydrogel materials. The joint replica models provide for real feedback helpful in designing surgical equipment and/or implants that minimize deleterious effects on sensitive joint tissues.

Model embodiments of the subject invention may be nearly as simple to use as a bench top fixture, but provide feedback that is superior in many respects to cadaver tests, animal studies, and even human clinical trials. In fact, a prototype device may be tested not just in terms of device performance, but also in terms of effect on the target anatomy. In certain embodiments, components of the joint replica models may be removed, allowing a quasi-histological examination of the target anatomy after each use. In addition, because the models are artificial and mass produced, multiple tests may be performed either under identical conditions or by altering only the test parameters (temperature, flow, contact angle, etc) desired. This capability helps to eliminate the statistically confounding effect of model variation that plagues cadaver, animal, and human subject studies, and also enables the use of designed experiments to explore device-tissue interactions and interactions between various design parameters.

Some embodiments of the subject invention have several advantages over typical bench top fixtures. Some fixtures in use today may be designed to mimic the overall size and geometry of a particular target tissue, and the best of these are also designed to work at body temperature in the presence of fluids. However, the use of engineering materials in the construction of these models make them dissimilar to the target anatomy in a profound way. This calls into question the value of any data collected, even when designed experiments are employed. In addition, these models may only be used to predict device performance, not the effect of the device on the target tissue.

In contrast, some embodiments of the subject invention enable a potentially large number of tests to be completed in an environment that is both geometrically and mechanically similar to the target anatomy. These tests may be performed by an engineering technician on a lab bench, but the tests still produce very high quality data. Also, because this data may be generated early in the development cycle, design errors are discovered sooner, leading to a shorter cycle and a reduced development budget. Further, unlike traditional bench top testing, use of embodiments of the subject invention allows the user to predict how a device will actually function in the human body, and since the effect of the device on the target tissue can be predicted by way of the quasi-histological examination, the risk to the patient may be predicted from the beginning of the process.

Use of embodiments of the subject invention also have several advantages over cadaver studies. Cadaver models provide a fairly accurate representation of size and geometry, but the mechanical properties of the target anatomy are altered by death of the subject and by the required tissue preservation techniques. It is impossible to use these models at normal body temperature or in the presence of fluids, and they cannot be employed to accurately predict the physical effect of the device on the target tissue. An educational institution must almost always be contracted (along with a principal investigator) to perform the study, and since the specimens are difficult to source it is common to run only a single test. Biohazards are an additional risk.

In contrast, use of embodiments of the subject invention enables the generation of animal study quality data (in a much greater quantity) using a simple bench top setup that may be used by an engineering technician. The need to contract with research facilities, employ costly medical practitioners, and also any exposure to biohazards is eliminated. In addition, these models may be used at body temperature in the presence of any real or simulated physiologic fluid, and since the device contacting portions of the model may be removed and replaced, an unlimited number of tests may be performed.

Models according to embodiments of the subject invention have several advantages over live animal models. As previously stated, the quality of data produced in these studies can be very high, particularly if the proper animal model is selected, the device and protocol are well designed, and the correct number (more is always better) of animals is employed. However, a registered facility must be contracted to run the study and care for any animals purchased. A surgeon must be retained to perform the required procedures, generate the study protocol, and to ensure approval from the animal care and use committee of the facility. The services of a veterinarian, anesthesiologist, and surgical aide are also required. Needless to say, these studies are very expensive and grow ever more costly as the number of animals is increased. The cost of discovering a design flaw at this stage is very high, possibly causing modification, termination, or repetition of the study. Biohazards are also a significant risk.

In effect, the inclusion of models according to the subject invention in the development process allows the collection of animal study quality performance data (Table II) at a risk level that is normally associated with bench top studies (see ARM representing models according to the subject invention). In fact, by employing this technology early on in the development process, vital feedback on device performance may be collected before erroneous assumptions can adversely affect the design. This capability not only reduces the probability of costly late stage design changes, but also shortens the project timeline and reduces the overall cost of development. In addition, these models may be used in an ordinary laboratory by engineering personnel. The need to own or contract with research facilities, pay for costly medical practitioners, and absorb risks associated with biohazard exposure are all eliminated. An innocent life (the animal) is also spared.

TABLE II

A comparison of the various model types available in industry.

| | Model Criteria | | | | | | | | |
|---|---|---|---|---|---|---|---|---|---|
| | Positive Attributes | | | | Negative Attributes | | | Quality Attributes | |
| Model | Lab Testing Possible | Predict Tissue Damage | Target Anatomy Modeled | Tissue Properties Modeled | Medical Contractors Required | Biohazard Exposure Risks | Live Animal Loss | Data Quality | Relative Expense |
| ARM | X | X | X | X | | | | High | Med |
| Fixture | X | | X | | | | | Low | Low |
| Cadaver | | | | | X | X | | Med | Med |
| Animal | | X | | X | X | X | X | High | High |
| Human | | X | X | X | X | X | | High | Extreme |

These and other advantageous aspects of the subject invention are described in the detailed description below, description of the drawings, and the appended claims.

DEFINITIONS

Figure 1:
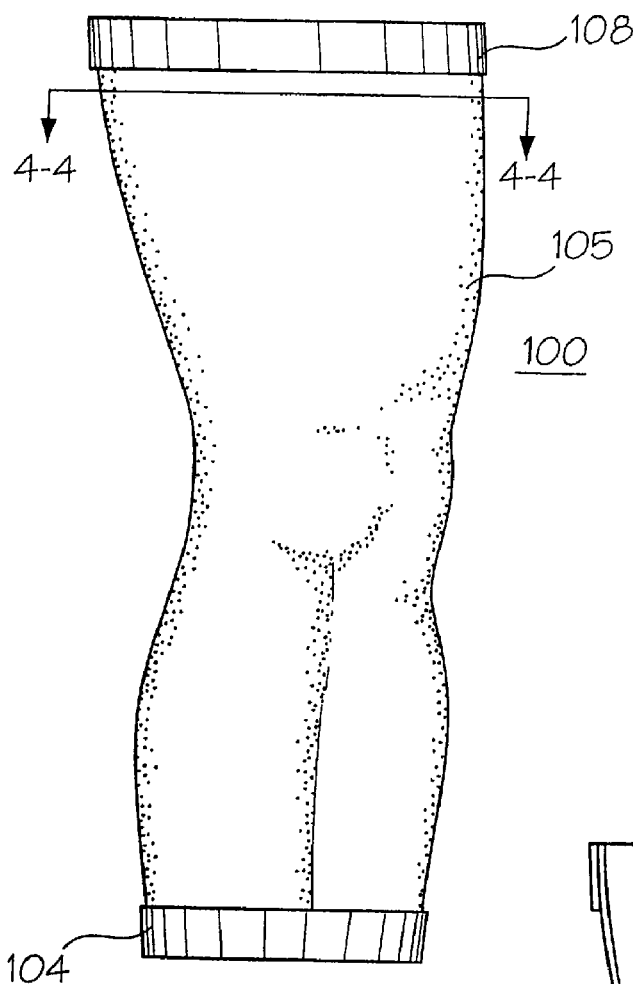
FIG. 1 shows an anterior external view of a knee joint replica model.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The term "artificial" as used herein to describe a model component refers to a component that is either synthetically manufactured or naturally manufactured in vivo and assembled with other model components. In the case of naturally manufactured artificial components, this may refer to actual tissues or anatomical structures procured from a cadaveric human or from a nonhuman subject that are removed from the subject processed and assembled with other artificial components.

The term "tissue analog material(s)" as used herein refers to a material or combination of materials designed to simulate one or more physical characteristics (properties) of a relevant living target tissue. Analog materials used to design tissue analog materials may include, but are not limited to, hydrogel, interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. For model embodiments comprising one or more components, each component part may be constructed from one or more tissue analog materials.

The tissue analog materials are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue analog material is designed so that one or more physical characteristics of the tissue analog material will sufficiently match the corresponding physical characteristic(s) of the relevant tissue on which the tissue analog material is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, 5$^{th}$ Ed., McGraw-Hill, 1989.

(2) Harper, C. A., *Handbook of Materials for Product Design*, 3$^{rd}$ Ed., McGraw-Hill, 2001.

(3) Askeland, D. R., *The Science and Engineering of Materials*, 2$^{nd}$ Ed., PWS-Kent, 1989.

(4) LaPorte, R. J., *Hydrophilic Polymer Coatings for Medical Devices*, Technomic Publishing, 1997

(5) Hayt, W. H., and Kemmerly, J. E., *Engineering Circuit Analysis*, 4$^{th}$ Ed., McGraw-Hill, 1986.

(6) Park, J. B., and Lakes, R. S., *Biomaterials, An Introduction*, 2$^{nd}$ Ed., Plenum Press, 1992.

(7) Lindenburg, M. R., Editor, *Engineer in Training Manual*, 8$^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," *International Symposium*-ISMS 2004, Cambridge, Mass., Jun. 17-18, 2004 and references cited therein; and Brouwer et al. "Measuring in Vivo Anaimal Soft Tissue Properties for Haptic Modeling in Surgical Simulation", *Proc. Medicine Meets Virtual Reality*, Newport Beach, Calif., IOS Press, 2001, and references cited therein.

Particular teachings of certain physical characteristics are noted (references numbers related to preceding list):

*Tensile strength and modulus*, both measured in Pascal (Pa)—Ref 1, pg 186.

*Compressive strength and modulus*, both measured in Pascal (Pa)—Ref 2, pg 718.

*Shear strength and modulus*, both measured in Pascal (Pa)—ASTM Standard D3165-00, Standard Test Method for Strength Properties of Adhesives in Shear by Tension Loading of Single-Lap-Joint Laminated Assemblies.

*Coefficient of static and dynamic friction*, a dimensionless number—Ref 7, pg 445.

*Surface tension*, measured in dynes/cm—Ref 6, pg 57.

*Wettability*, measured in terms of contact angle (degrees)—Ref 4, pg 3.

*Water content*, measured in mass percent (%)—Ref 4, pg 41.

*Electrical resistance and conductance*, measure in ohm for resistance and mho for conductance—Ref 5, pg 25.

*Dielectric properties*, measured in various units—ASTM Standard E2039-04 Standard Test Method for Determining and Reporting Dynamic Dielectric Properties.

*Optical absorption and transmission*, measured in $cm^{-1}$—Ref 3, pg 739.

*Thermal conductivity*, measured in cal/(cm-s-C)—ASTM Standard D5930-01 Standard Test Method for Thermal Conductivity of Plastics by Means of a Transient Line-Source Technique.

*Porosity*, measured in volume percent (%)—Ref 3, pg 490.

*Moisture vapor transmission rate*, measured in g/(mil-in$^2$)—Ref 2, pg 941.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The "data value" as used herein refers to a numerical value that is representative of a measurement of one or more physical characteristics. The numerical value is typically provided in a unit of measurement obtained from observation of a specimen under a defined set of conditions.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure.

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

In certain model embodiments, one or more components may be cooperative with other one or more components. The term cooperative in this context means that such cooperative components are contiguous, engaged, or integrated with one another. Further, components cooperative with one another may be designed to be dissociable, i.e., removably cooperative.

In certain model embodiments, one or more components may be cooperative with other one or more components. The term cooperative in this context means that such cooperative components are contiguous, engaged, or integrated with one another. Further, components cooperative with one another may be designed to be dissociable, i.e., removably cooperative.

DETAILED DESCRIPTION

The interaction of a foreign body with living tissues results in complications that are related to, among other things, shear forces, normal forces, abrasive action, blunt trauma, pressure necrosis, or other physical insults caused by the invading device. Not only are studies to predict the long-term effect of this invasion difficult and expensive to conduct, but when live patients are involved the studies often yield inconclusive results. As an alternative to using these patients, a bench top model may be employed to physically simulate the insult to the tissue as a relatively inexpensive, easily repeatable, and logical first step before resorting to animal studies and clinical trials. However, for this approach to be productive, the model employed must be representative of the actual target anatomy in which the medical device will normally be used.

The subject invention pertains to complex synthetic joint replica models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention create a test environment similar in many ways (mechanical properties, physical properties, temperature, flow rate, viscosity, etc) to that of a living animal. In addition, individual tests may be repeated as many times as desired under identical or (if desired) altered conditions. Also, the tissue-contacting portion of the model may be removed to allow a quasi-histological examination to be performed after each test, an important feature that allows the engineer to predict the tendency of a particular device to inflict injury (or other effect) on the patient.

A study employing the models of the subject invention allows the generation of data that is comparable, and in some ways superior to that of an animal study. Furthermore, since these studies employ a reproducible model, the statistically confounding effect of variation between animals is eliminated. The ability to perform truly reproducible tests allows interactions between the device and the model, as well as interactions between multiple design parameters to be evaluated, a task which is nearly impossible with an animal study. In addition, the expense related to the purchase and housing of animals, contracting registered facilities, and retaining medical practitioners is eliminated. The risks associated with biohazards are also eliminated and a number of innocent animals are spared.

Available benchtop fixtures are designed to mimic the general size and geometry of a target tissue, and the best of these are also designed to work at body temperature in the presence of fluids. However, the typical use of engineering materials in their construction makes these common models dissimilar to the target anatomy and calls into question the value of any data collected using them, even when designed experiments are employed. In addition, these models may only be used to predict device performance, not the effect of the device on the target tissue.

In comparison, the model embodiments of the subject invention enable for the first time a potentially large number of tests to be completed and repeated under identical conditions in an environment that is both geometrically, mechanically, and physically similar to the target anatomy. An engineering technician may perform these tests on a simple benchtop setup, while still generating very high quality of data. Also, because this data is provided early in the development process, design errors may be discovered earlier; leading to a shorter development cycle and a reduced development budget. Finally, since the effect of the device on the target tissue can be predicted, device quality is improved.

Available cadaver models can provide a fair representation of anatomical geometry, but the mechanical and physical properties of the target anatomy are altered by preservation techniques. It is impossible to use these models at normal body temperature or in the presence of test fluids, and they cannot be employed to accurately predict the physical effect of the device on the target issue. An educational institution must generally be contracted, along with a principal investigator, to perform the study, and since the specimens are difficult to source it is common to run only a single test. Biohazards are an additional risk.

In comparison, the model embodiments of the subject invention facilitate the generation of animal study quality data using a simple benchtop setup that can be used by an engineering technician. These models may be used at body temperature in the presence of any real or simulated physiologic fluid, and since the device contacting portions of the model may be removed and replaced, an unlimited number of tests may be performed. The need to contract with research facilities, employ costly medical practitioners, and expose staff to the risks associated with biohazards are eliminated.

The models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to get the geometric data directly from a patient or from sources such as the Visible Human Project.[2]

After collecting the appropriate geometric data, the individual model components may be fabricated from appropriate analog materials. Depending on the complexity of the part and the type of materials used, the individual component might be molded, extruded, or machined. For complex geometries, however, these techniques may become cumbersome and expensive. In these cases rapid prototyping techniques such as stereolithography offer a relatively inexpensive alternative. Techniques are being developed that allow actual patient data (obtained from MRI or spiral-CT images) to be fed directly into the rapid prototyping system, thus replicating the patient's anatomy exactly. This technology allows for the production of extremely realistic simulations.

The models of the subject invention are constructed from multiple components, and these individual components are fabricated in such a way that they mimic the geometry (length, width, diameter, thickness, cross-section, shape, etc) of a particular portion of the target anatomy that is relevant to the medical device under test.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

The first design parameter typically entails selecting physical properties that are important for the analog material to mimic in the decided application. These properties will vary depending on the type of device under test, the target anatomy, and the general objective of the testing. Any number of properties may be included in the target properties list, but it should be noted that as this list gets longer it becomes progressively more difficult to satisfy all of the design requirements. In fact, in typical embodiments, if a particular component requires an analog material with more than three target properties it might be better to separate the components into multiple parts.

The second design parameter typically involves selecting the source of the physical properties data. That is, it should be determined if the model will be based on human or animal (or both) tissue properties. Once this is determined, the data may either be drawn from the literature or generated directly by performing the appropriate physical tests on actual samples of the target tissues. The most common tissue sources for non-human properties tests are the sheep and pig, but other animal sources are possible as well.

The data collected from this testing regime will be used as a target in the design of the analog materials, and the design intent is that these analog materials exhibit physical properties that mimic the physical properties of the target tissue samples. After the materials are formulated their performance will be verified by repeating the same physical properties tests that were performed on the original tissue samples on the newly formulated analog material samples. Of course, these tests must be performed under conditions as reasonably similar as possible to the original (tissue sample) tests.

Part of the design process involves prioritizing the various target properties for the synthetic analog materials. Less important properties should be placed further down the list and given a lower priority during the formulation process. This is typically, though not necessarily, required because the design becomes progressively more difficult to produce as the number of modeled properties increases. The number of target properties are preferably limited to three or fewer. If more complex model behavior is required than this restriction will allow, then the number of components can be increased instead. For example, the artery might by constructed from three two-property analog materials instead of one three-property analog. Typically, a component comprised of several analogs will exhibit a more complex (and realistic) response than a component constructed from a single (multi-property) analog.

Typical engineering materials, including many metals, ceramics, and plastics commonly employed in industry may be used depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particulary advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The models of the subject invention may employ a wide variety of hydrogel materials, including but not limited to polyvinyl alcohol, polyvinyl pyrrolidone, polyethylene oxide, polyhydroxyethyl methacrylate; polyethylene glycol, hyaluronic acid, gelatin, carrageen, alginates, chondroitan sulfate, dermatan sulfate (and other proteoglycans). This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly(vinyl alcohol) is normally produced by the acid-catalyzed hydrolysis of poly(vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100° C. to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale.

Validation of embodiments of the subject models is, in most cases, a desired objective. First, it will help determine the degree of realism of the simulation—in other words, how accurately the simulation performs compared to the in vivo environment. If the intent is to simulate blood flow in the carotid artery, for example, one type of validation would reveal how flow rate in the simulation compares to the flow rate in the patient.

Validation also identifies the limitations of the simulation. Especially in theoretical simulations, it is important to understand not only the accuracy of the model but also the circumstances under which it breaks down. A simulation might be highly accurate under normal situations, but if an abnormality is introduced, the simulated results might not be representative of a similar abnormality in vivo. Finally, if data from the simulation will be used in support of an FDA submission, it is even more important that the simulation be validated. The stronger the validation, the stronger the submission.

In general, three validation strategies are available: quantitative, qualitative, and indirect. Quantitative validation involves collecting numerical data from the simulation and comparing it to data collected in vivo under similar conditions. Collecting quantitative data usually involves the use of instrumentation—for example, pressure transducers to record simulated blood pressure. Common diagnostic technologies such as ultrasound or MRI might also be used. Of course, technologies such as ultrasound are designed for use on biological tissue, and since the simulation will probably be made of inert materials, some modifications may be necessary, as those skilled in the art will appreciate in view of the teachings herein.

In qualitative validation, experienced users (usually clinicians) use the device in the simulation following the same protocols they would follow when using the product in a patient. After the simulated procedure, users convey in as much detail as possible how the device performed in comparison to their experience of using a comparable device in a patient. To test a new product, the manufacturer should identify current users of similar products. For obvious reasons, users having the most clinical experience will typically yield the best results. When used properly, the "touchy-feely" data generated in the qualitative validation are as important as the numerical data obtained from the quantitative validation.

Indirect validation involves the comparison of physical performance data from the model to the actual use environment. This is the type of validation that is integral to the design process for Animal Replacement Models. The basic logic behind this form of validation is that if the individual model components exhibit properties similar to the target tissues then the model as a whole will exhibit performance similar to the synthetic organ being constructed. This type of validation will typically be followed by other tests once the model is completely constructed.

A strong validation strategy involves a combination of all of these techniques. Conducting only one type of validation leaves open the possibility that some important piece of information has been missed. When used together, the results help maximize the accuracy and degree of realism of the simulation.

The model embodiments of the subject invention comprise features that make them valuable for medical device design and development testing. First, since the models are designed to respond to physical stimulus in a fashion similar to the target (human or animal) anatomy, device performance in the model may be used to predict device performance in the target anatomy. Second, the device interfacing portion of the model may be removed for quasi-histological examination, allowing the effect of the device on the target anatomy to be measured. This is particularly important because it allows the potential for injury to be predicted. Third, because the device interfacing portion of the model can be removed and replaced, a large number of tests can be performed under either identical or varying conditions as desired. This would allow the generation of descriptive statistics on device performance and the execution of meaningful designed experiments, both of which are impossible with live animals or cadavers. Fourth, if a hydrogel substrate is employed to support a living tissue bed, the effect of the test device on actual living cells can be predicted. Fifth, the models may be equipped with pumps, heaters, and other accessories to more accurately model almost every aspect of actual use conditions. Sixth, the models may be equipped with sensors that allow the measurement of device influences such as applied force and pressure on portions of the target anatomy. Also, these models provide a wide range of cost, safety, and logistical benefits to device developers compared to existing benchtop models, cadavers, and live animals.

Description of the Illustrative Embodiments

Turning to the figures, FIG. 1 shows an anterior, exterior view of a knee joint replica model 100 according to one embodiment of the subject invention. The model 100 geometrically mimics a section of a human leg spanning from mid-thigh to mid-shin. Model 100 comprises an external casing 105 designed to simulate skin. Furthermore, the model 100 comprises a first brace 108 and second brace 109 disposed at opposite ends of the model 100 which serve to secure the ends of the model 100 and to assist in holding interior components of the model (see FIGS. 2-3) in their intended position. First and second braces 108, 109 may take the form of a band that squeezes components of the model together.

Figure 2:
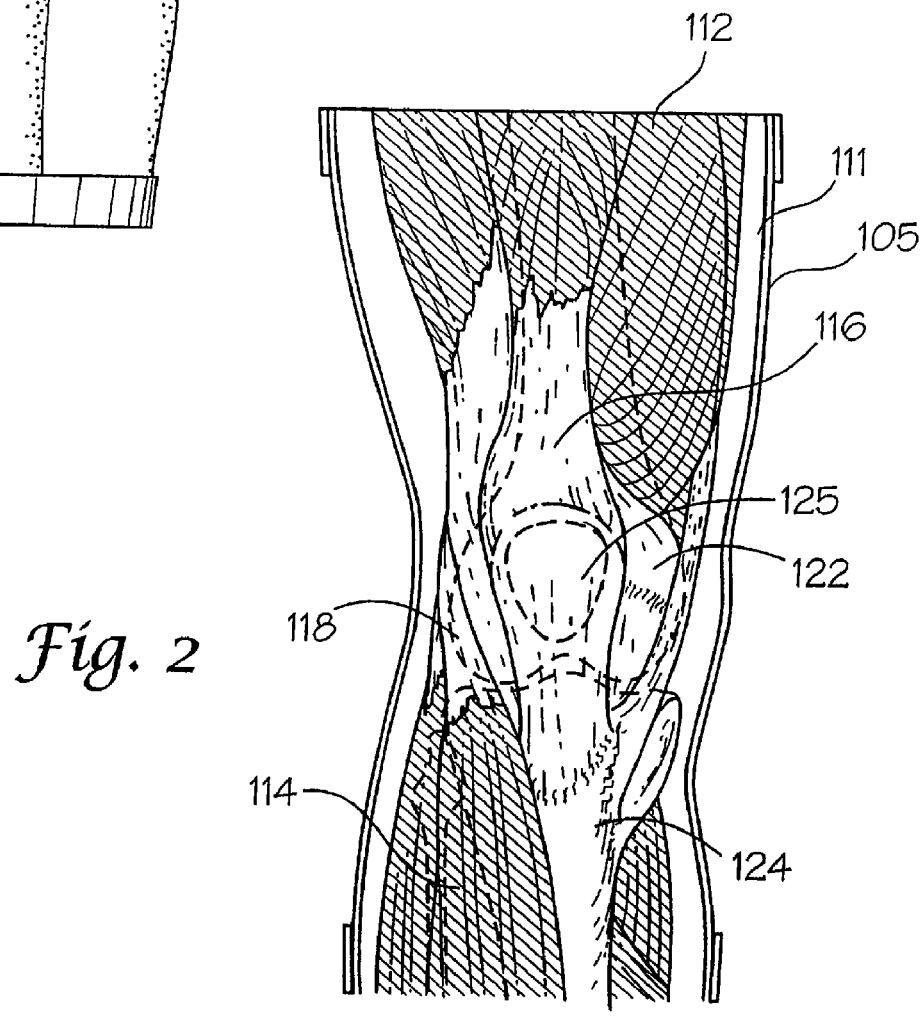
FIG. 2 shows an anterior view of a knee joint replica model with muscle layer exposed.

FIG. 2 shows an anterior open view of the model 100 of FIG. 1 showing components at a level internal to the external casing 105. Artificial muscle components 112 geometrically mimicking muscles of a human thigh and 114 geometrically mimicking muscles of the shin are cooperative with artificial bone components 124 and 122, respectively (discussed in further detail below). More specifically, artificial muscle components 112 are cooperative with bone component 124 by way of an intermediate artificial tendon component 116 that is configured to geometrically mimic a patellar tendon with artificial patella bone component 125. Artificial muscle components 114 are cooperative with artificial bone component 122 by way of an intermediate artificial tendon component 118. Artificial muscle components may be integral with or attached to (or both) artificial tendon components which are then integral with or attached to artificial bone components. Tendon components may be attached to artificial bone components by stapling, sewing, adhesives, rivets, tying, etc. In a specific embodiment, the end of the artificial tendon is inserted into a receptacle defined in the artificial bone component and fastened therein. Exterior to muscles 112, 114 is an artificial fat layer 111. This artificial fat layer 111 is disposed between the muscles 112, 114 and the artificial casing 105.

FIGS. 11-14 show photos of a specific embodiment of an attachment of muscles to a bone component. This configuration could also be implemented for attaching ligaments to a bone component. FIGS. 11-14 show the attachment of an artificial biceps muscle to an artificial humerus shaped bone component 1210. The muscle 1110 is a complex hydrogel composite, composed primarily of water and PVA, but also including randomly oriented short microfibers, axially oriented macrofibers, and fabric mesh. The hydrogel formula is different for the "tendon" 1112 and "muscle" 1110 parts in the pictured piece. The unit is externally fastened to the bone using connectors 1114 on the axially oriented macrofibers, which are bonded internally to the fabric mesh, hydrogel tendon, and hydrogel muscle components. The bone connectors consist of metal tubing and metal rod. Each axial macrofiber is placed into a discrete tube and a rod piece is pushed in to secure the fiber. That assembly is then press-fit into a predrilled hole 1212 in the bone to secure the muscle on the bone.

Figure 3:
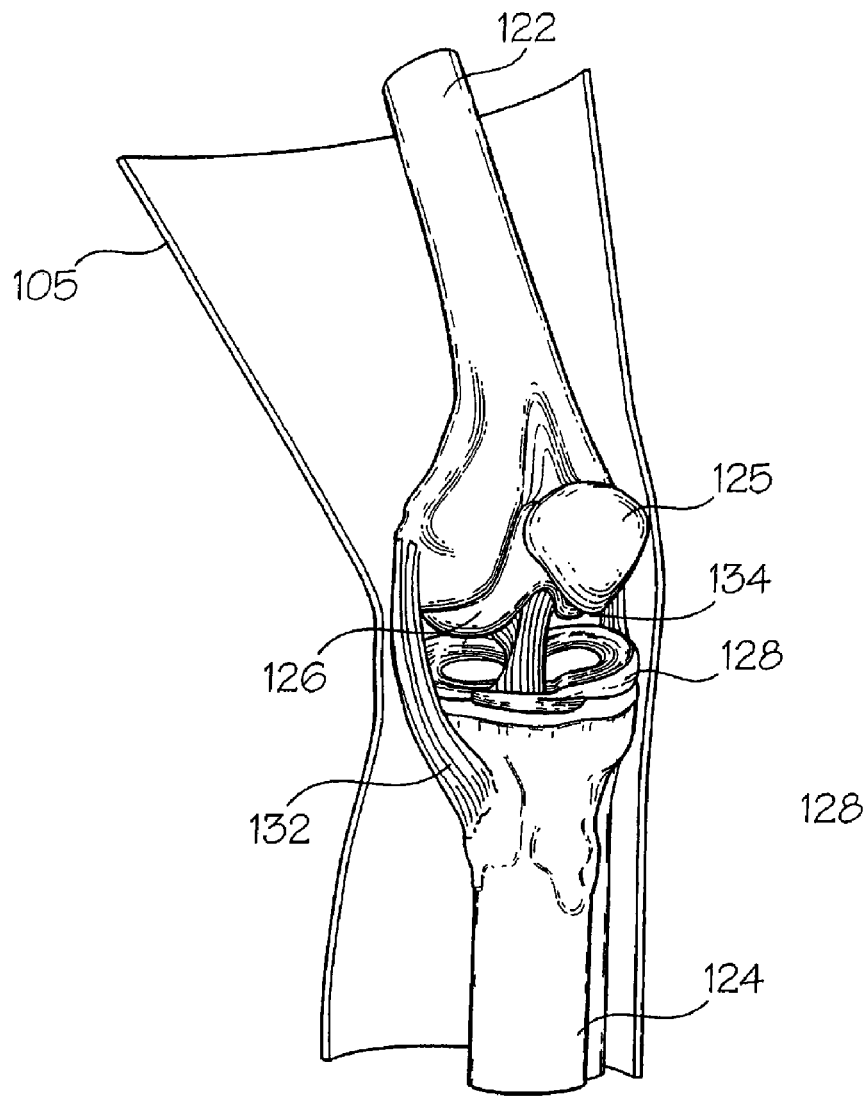
FIG. 3 shows a side perspective view of a knee joint replica model with internal bone components exposed.
Figure 4:
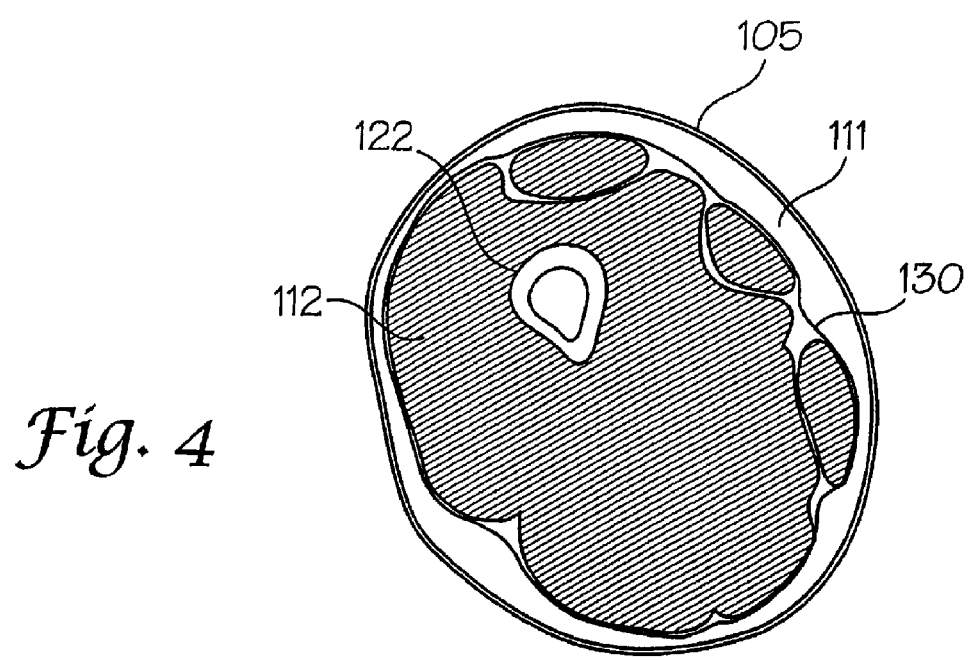
FIG. 4 shows a cross-sectional view of the embodiment shown in FIG. 1 along the A-A axis.

FIG. 3 shows a more interior view of the model 100 shown in FIGS. 1 and 2, further revealing the artificial bone components 122, 124. Artificial bone component 122 geometrically mimics the lower portion of a human femur bone. Artificial bone component 124 geometrically mimics the upper portion of a human tibia bone. Furthermore the patella component 125 is shown separate from the patellar tendon component 116. The distal end of the artificial bone component 122 comprises an artificial cartilage layer 126 cooperative thereto. The proximal end of the second artificial bone component 124 comprises an artificial cartilage layer 128 cooperative thereto. The artificial bone components 122, 124 are urged together by artificial ligament components 132 and 134 which are cooperative therewith. FIG. 4 shows a cross-sectional view at line 4-4 shown in FIG. 1. In addition to the artificial casing 105, artificial fat layer 111, artificial muscle components 112 and artificial bone component 122, a thin artificial connective tissue layer 130 between artificial muscle components 112 and artificial fat layer 111 is shown.

Figure 5:
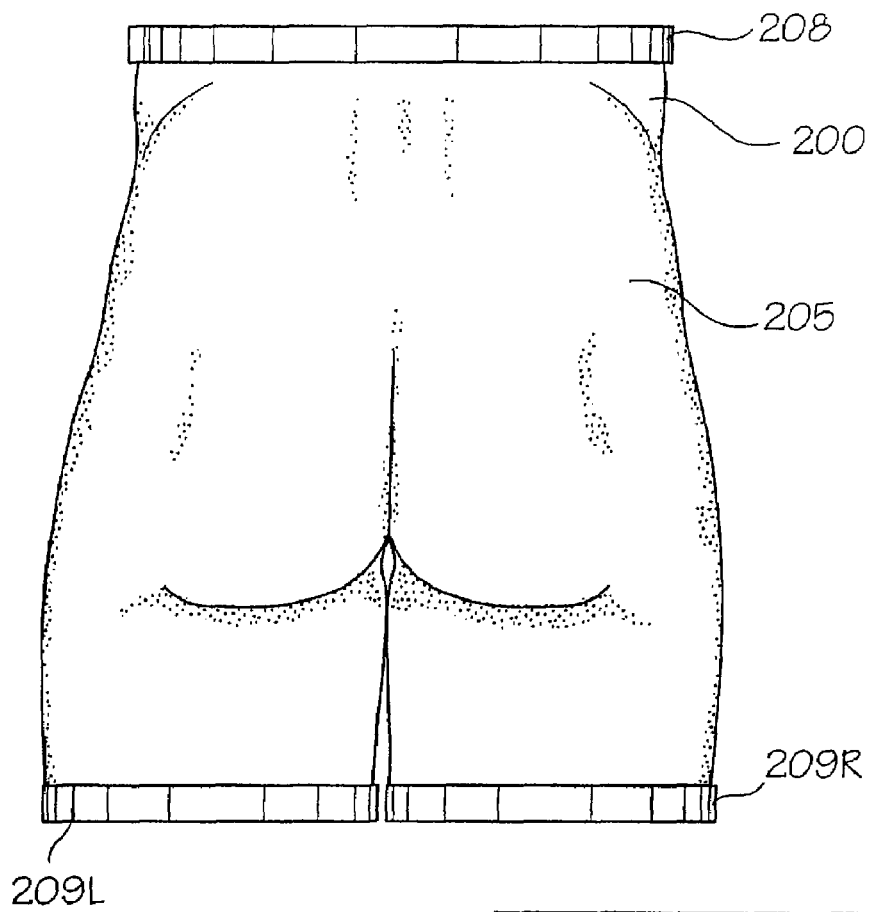
FIG. 5 shows a posterior external view of a hip joint replica model.
Figure 6:
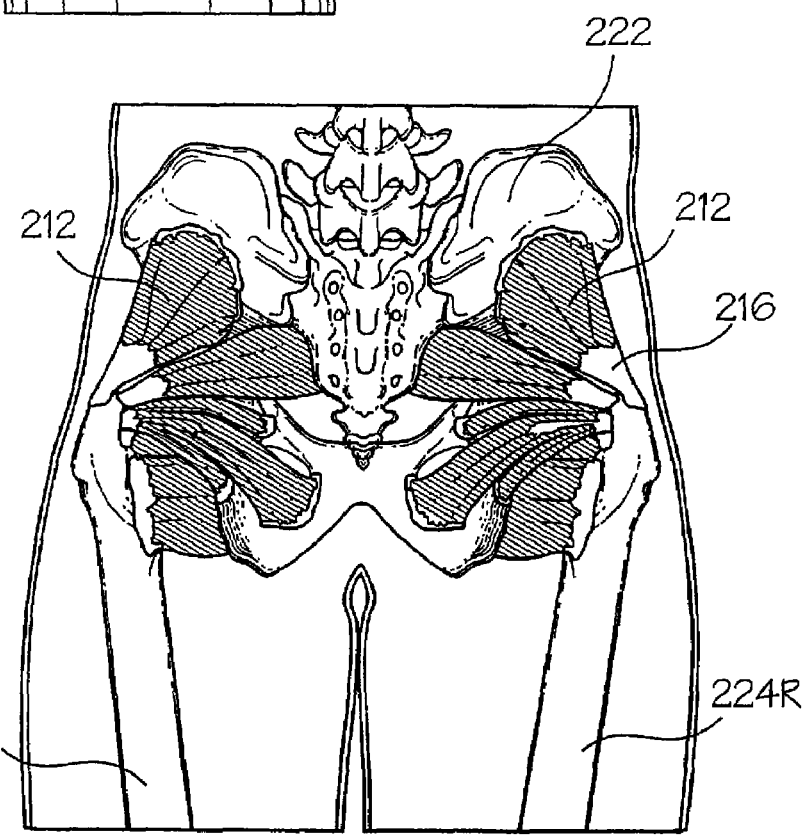
FIG. 6 shows a posterior view of a hip joint replica model with muscle layer exposed.

FIG. 5 shows a posterior view of a hip replica model 200. The hip model 200 comprises an artificial tissue casing 205 designed to simulate human skin. The model 200 also comprises braces 208 and 209R,L which serve a similar purpose to braces 108 and 109 as described above for model embodiment 100. FIG. 6 shows a posterior, open view of model 200 revealing components of the model 200 interior to the casing 205. Artificial muscle components 212R,L geometrically mimicking muscles of a human hip are cooperative with artificial bone components 222 and 224R,L, respectively. Artificial muscle components 212R,L are cooperative with bone components 224R,L by way of an intermediate artificial tendon component 216.

Figure 7:
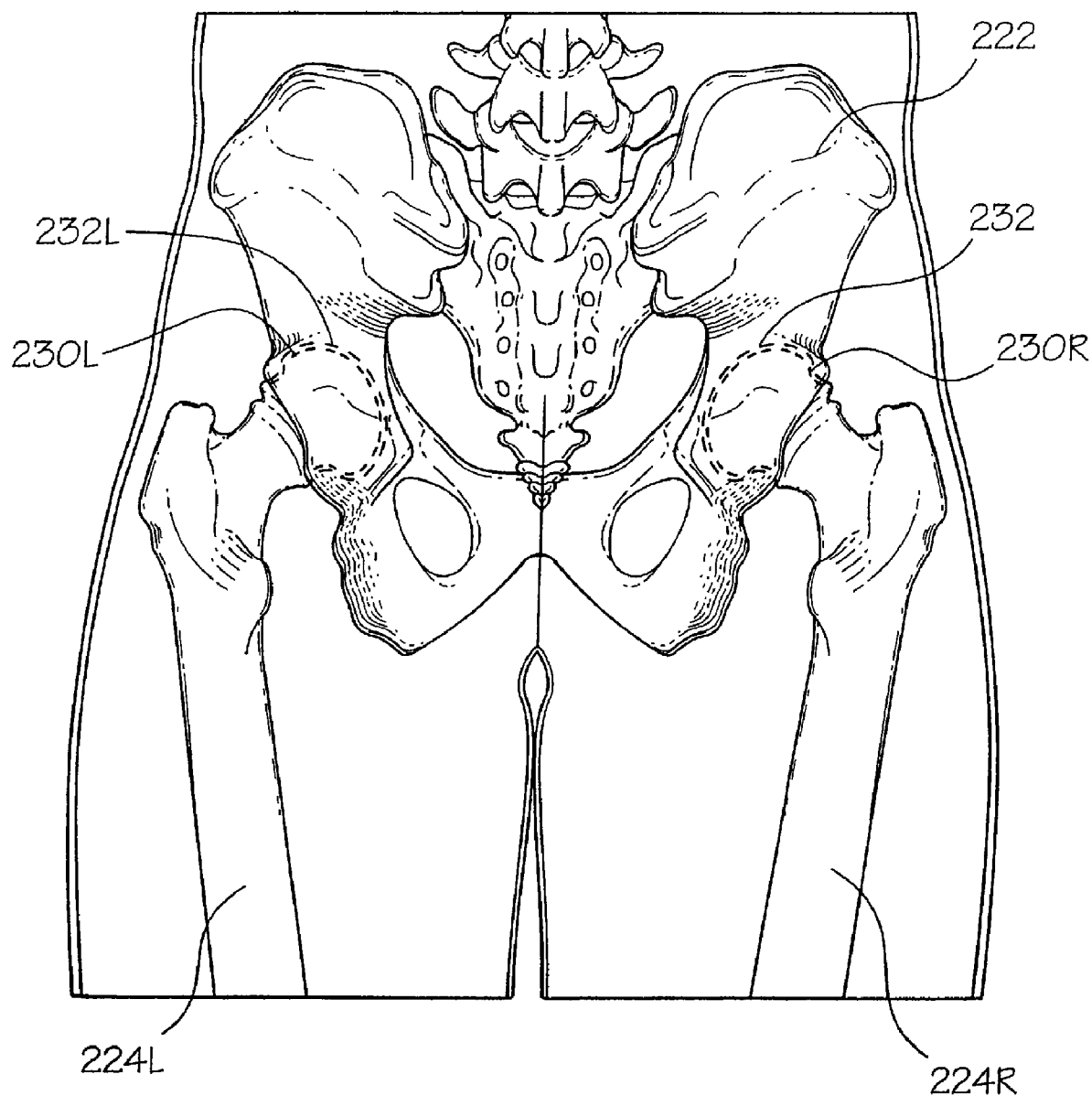
FIG. 7 shows a posterior view of a hip joint replica model with bone components exposed.

FIG. 7 shows a more interior view of the model 200 shown in FIGS. 5 and 6, further revealing the artificial bone components 222, 224R,L. Artificial bone component 222 geometrically mimics a human pelvis bone. Artificial bone components 224R,L geometrically mimic the upper portion of a femur bone. Defined on the proximal end of the artificial bone components 224R,L are ball shaped structures 230 R,L. Defined in artificial bone component 222 are a right and left cavity 232R,L configured for receiving the ball shaped structure 230R,L. The cavities 232R,L geometrically mimic a human acetabullum. An artificial cartilage layer 236 R,L is cooperative with the ball shaped structures 230R,L.

Figure 8:
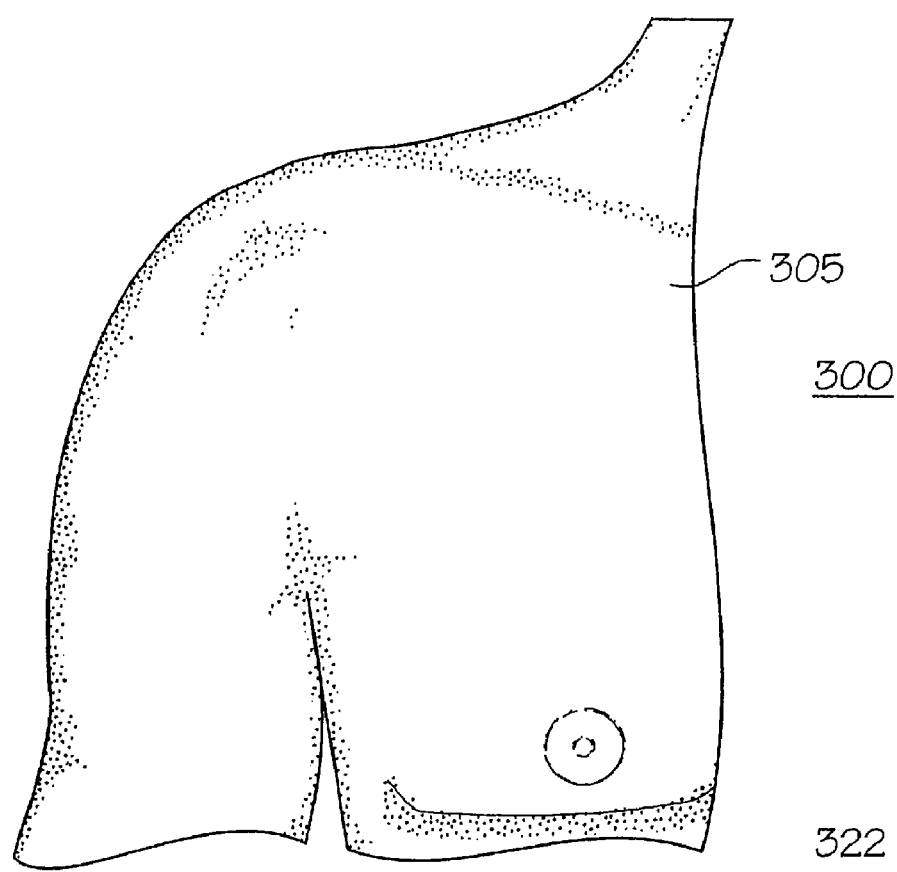
FIG. 8 shows an anterior external view of a shoulder joint replica model.
Figure 9:
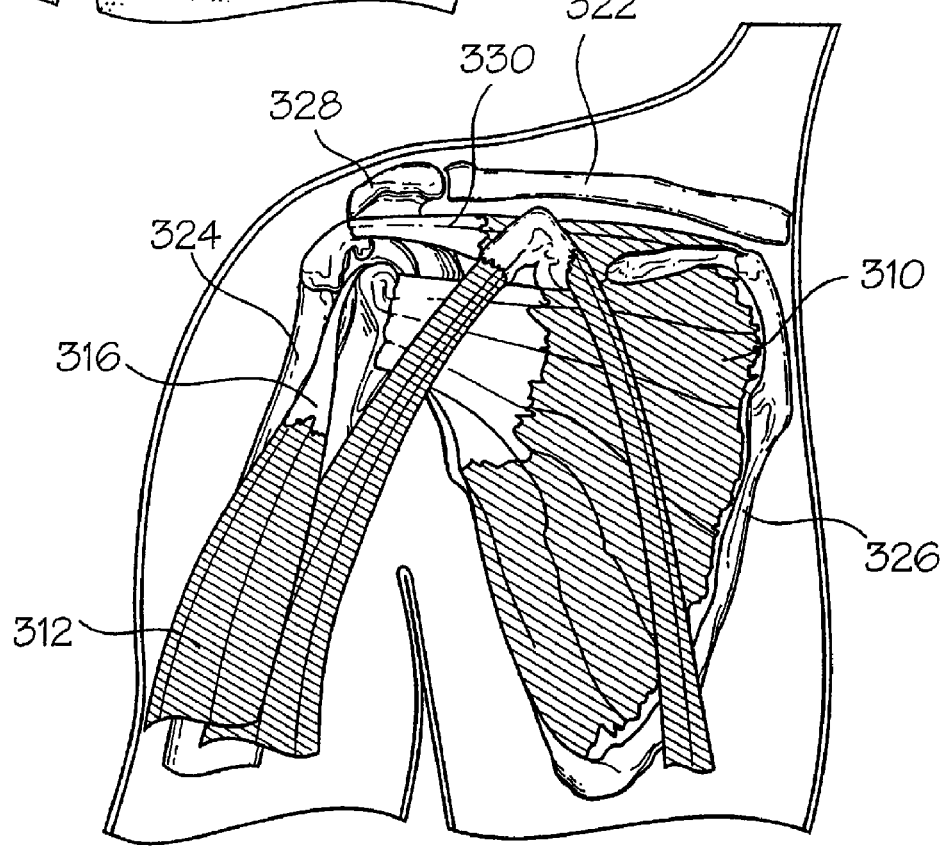
FIG. 9 shows an anterior view of a shoulder joint replica model with muscle layer exposed.
Figure 10:
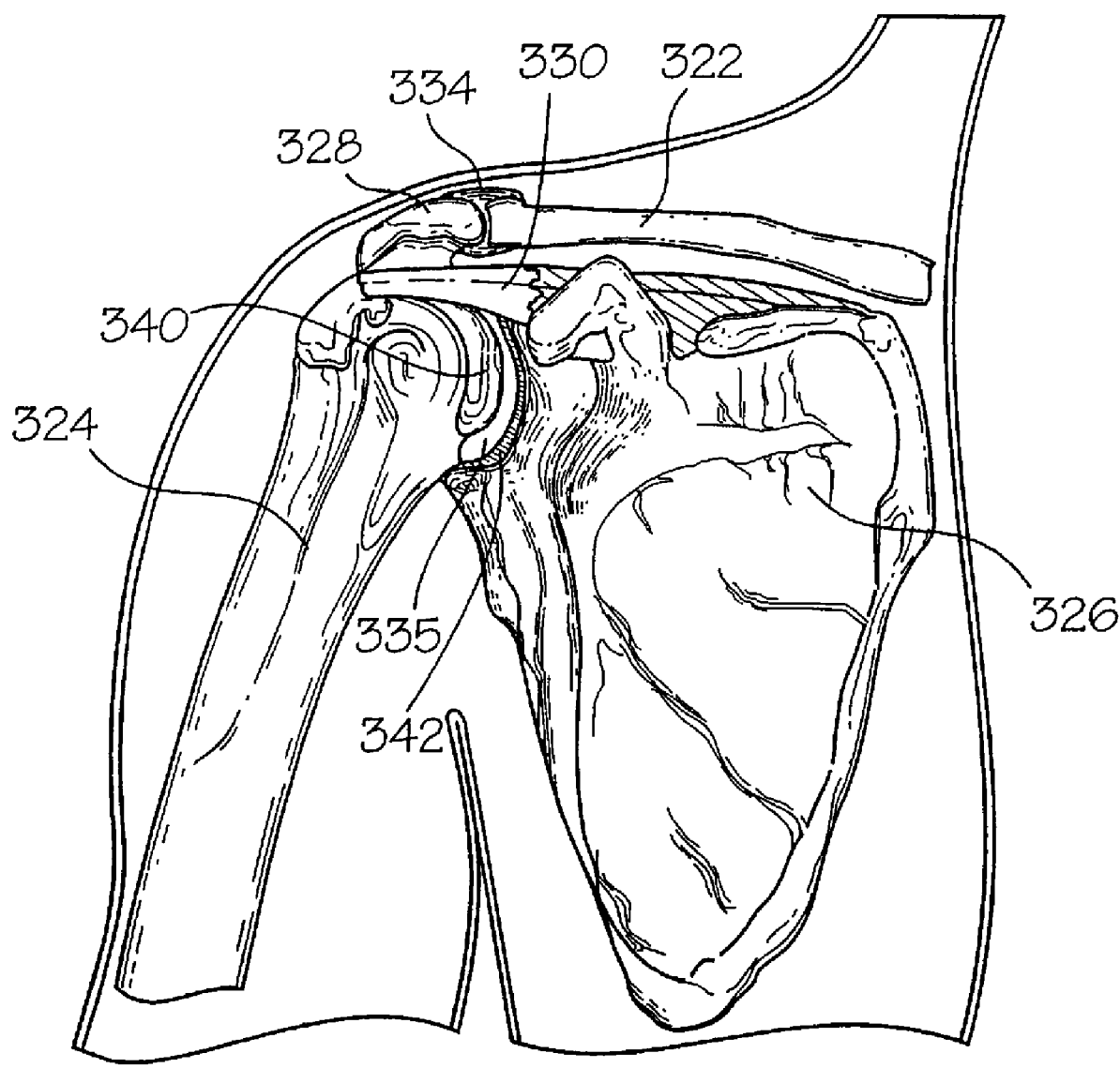
FIG. 10 shows an anterior view of a shoulder joint replica model with bone components exposed.
Figure 11:
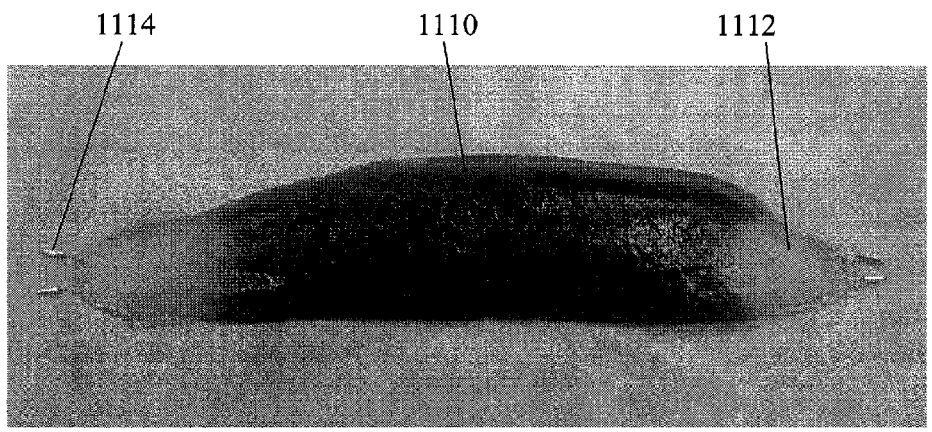
FIGS. 11-14 show photos of a specific embodiment of an attachment of muscles to a bone component.
Figure 12:
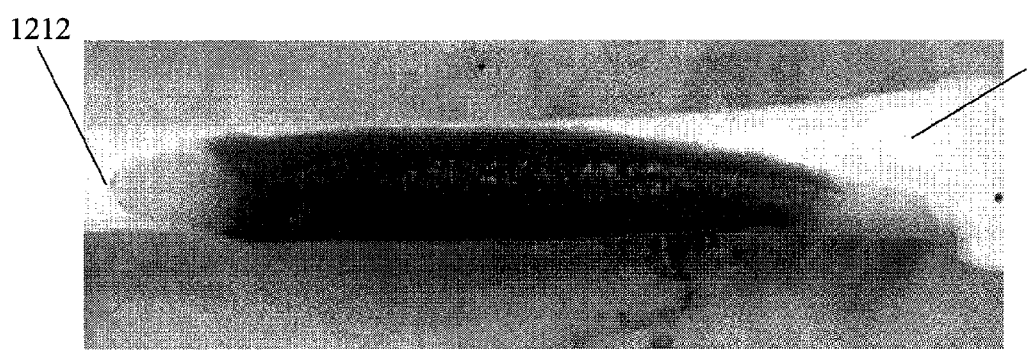
Figure 13:
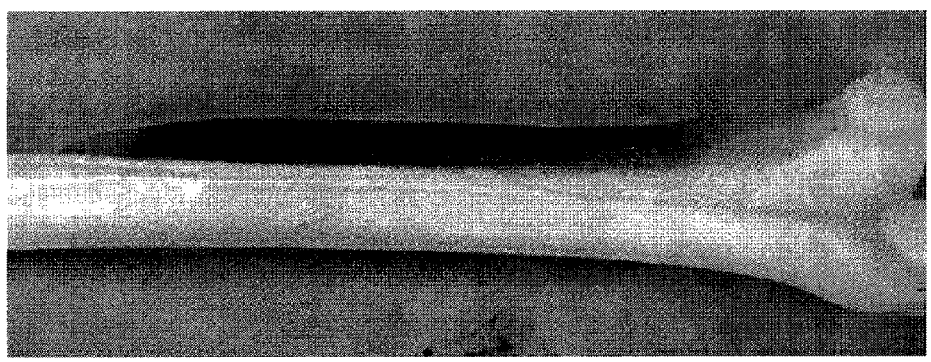
Figure 14:
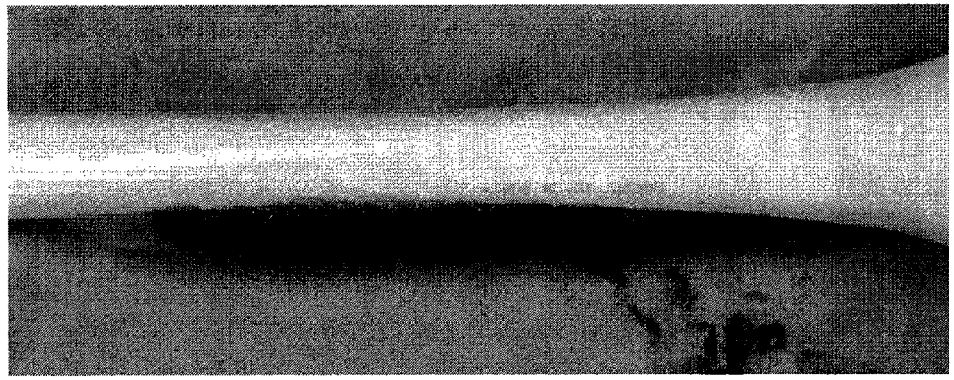

FIG. 8 shows an anterior view of a shoulder replica model embodiment 300 comprising an artificial casing 305. With reference to FIGS. 9-10, FIG. 9 shows an anterior, open view showing components of the model 300 internal to the casing 305. FIG. 10 shows a more internal view of the model 300 with most artificial muscle components removed. The model comprises artificial bone components 322, 324 and 325, which geometrically mimic a human clavicle, humerus and scapula, respectively. The proximal end of artificial bone component 324 comprises a ball shaped structure 340 defined thereon. Cooperative with the ball shaped structure 340 is an artificial cartilage layer 335. A shallow cavity 342 is defined on a distal end of artificial bone component 326. The ball shaped structure 340 and cavity 342 are urged together to form a joint that geometrically mimics a human glenohumeral joint. Artificial rotator cuff component 330 is cooperative with artificial bone component 324 at its distal end and artificial bone component 326 at its proximal end. Artificial bone component 326 also comprises a bone protrusion 328 defined thereon. Artificial bone component 326 is attached to artificial bone component 322 by an artificial connective tissue component 334. The joint formed by the bone protrusion 328 and artificial bone component 322 geometrically mimics a human AC joint. Muscle components 310 are cooperative with artificial bone components 324 and 326. Muscle component 312 geometrically mimics a portion of a biceps muscle that is attached to proximal end of artificial bone component 324.

In specific embodiments, the artificial cartilage layers, artificial muscle components, artificial tendon components, or artificial ligament components, or all such components depending on the model may be comprised of hydrogel material(s). Those skilled in the art will appreciate that fat layers and connective tissue layers may be employed with the models and made of suitable tissue analog materials that are designed to simulate one or more physical characteristics of such tissues.

In one embodiment, the hydrogel material is formed by admixing a monomer, water, and an initiator. The monomer polymerizes to form a polymer network. By way of example only, the admixture of components may comprise about 10 to about 50 percent, by weight, monomer; about 0.1 to about 5 percent, by weight, initiator, and about 45 to about 85 percent, by weight, water. In a specific example, the monomer used is n-vinyl pyrrolidone or hydroxyethyl methacrylate, or a combination thereof and the initiator used is ethyl 2,4,6-trimethylbenzoylphenylphosphinate (UV mediated). In a more specific example, the admixture comprises about 25 to about 30 percent, by weight, hydroxyethyl methacrylate; about 10 to about 15 percent, by weight, n-vinyl pyrrolidone; and about 55 to about 65 percent, by weight, water.

In another example, the hydrogel material is formed by admixing a polymer, water, and a cross-linking agent. By way of example only, the admixture may comprise about 5 to about 15 percent, by weight, polymer; about 1 to about 10 percent, by weight, cross-linking agent; and about 75 to about 95 percent, by weight, water. In a specific example, the polymer used is polyvinyl alcohol and the crosslinking agent used is glutaraldehyde. In a more specific example, the admixture comprises about 7 to about 9 percent, by weight, polyvinyl alcohol; about 11 to about 14 percent, by weight, glutaraldehyde; and about 78 to about 82 percent, by weight, water.

In a further example, the hydrogel material is formed by admixing a polymer, a monomer and an initiator. By way of example only, the admixture may comprise 10 to about 50 percent, by weight, monomer; about 5 to about 15 percent, by weight polymer; and about 35 to about 85 percent, by weight, water. In a specific embodiment, the monomer used is n-vinyl pyrrolidone or hydroxyethyl methacrylate, or combination thereof, and the polymer used is polyvinyl pyrrolidone. In a more specific embodiment, the admixturecomprises about 25 to about 30 percent, by weight, hydroxethyl methacrylate; about 10 to about 15 percent, by weight, n-vinyl pyrrolidone; about 5 to about 7 percent, by weight, polyvinyl pyrrolidone; and about 55 to about 65 percent, by weight, water.

Furthermore, in alternative examples joint replica models may define employ an artificial synovial fluid that is disposed in a joint cavity defined by the artificial bone components. By way of example only, such synovial fluid may be comprised of an aqueous solution of polyvinyl alcohol, polyvinyl; pyrrolidone, and/or polyethylene oxide, or other materials as one skilled in the art will appreciate in view of the teachings herein.

Finally, while various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The teachings of all patents and other references cited herein are incorporated herein by reference to the extent they are not inconsistent with the teachings herein.

What is claimed is:

1. An artificial joint replica model configured to geometrically mimic a human or nonhuman animal joint, said model comprising:
   a first artificial bone component comprising a proximal end and a distal end and comprised of a tissue analog material simulating at least one physical characteristic of living bone;
   a second artificial bone component comprising a proximal end and a distal end and comprised of a tissue analog material simulating at least one physical characteristic of living bone; wherein said distal end of said first artificial bone component and said proximal end of said second artificial bone component geometrically mimic the ends of two bones that form a human or nonhuman animal joint; and
   an artificial cartilage layer comprised of an analog material simulating at least one physical characteristic of cartilage and disposed onto at least a portion of said distal end of said first artificial bone component or said proximal end of said second artificial bone component, or both, wherein said first artificial bone component geometrically mimics a complete or partial hipbone comprising an acetabulum-shaped cavity defined therein and said second artificial bone component geometrically mimics a complete or partial femur bone comprising a ball shaped structure defined on said proximal end of said second artificial bone component and
   further comprising at least one artificial muscle component comprising a first end cooperative with said first artificial bone component and second end cooperative with said second artificial bone component such that said ball-shaped structure is urged to rest within said acetabulum shaped cavity.

2. The artificial joint replica model of claim 1,
   wherein said first artificial bone component geometrically mimics a pelvis comprising a right and left side, said pelvis comprising a right and left acetabulum-shaped cavity defined on each of said right and left side;
   wherein said second artificial bone component geometrically mimics a left femur bone comprising a ball shaped structure defined on said proximal end of said second artificial bone component and at least one left artificial muscle component cooperative with both said pelvis and said second artifical bone component such that said left artificial muscle component urges said ball shaped structure of said second artificial bone component to be held within said left acetabulum shaped cavity; and
   further comprising a third artificial bone component comprising a proximal end and a distal end, said third artificial bone component geometrically mimics a right femur bone comprising a ball shaped structure defined on said proximal end of said third artificial bone component; and at least one right artificial muscle component cooperative with both said right said of said pelvis and said third artificial bone component such that said at least one right artificial muscle component urges said ball shaped structure of said third artificial bone component to be held within said right acetabulum shaped cavity.

3. An artificial joint replica model configured to geometrically mimic a human or nonhuman animal joint, said model comprising:
   a first artificial bone component comprising a proximal end and a distal end and comprised of a tissue analog material simulating at least one physical characteristic of living bone;
   a second artificial bone component comprising a proximal end and a distal end and comprised of a tissue analog material simulating at least one physical characteristic of living bone; wherein said distal end of said first artificial bone component and said proximal end of said second artificial bone component geometrically mimic the ends of two bones that form a human or nonhuman animal joint; and
   an artificial cartilage layer comprised of an analog material simulating at least one physical characteristic of cartilage and disposed onto at least a portion of said distal end of said first artificial bone component or said proximal end of said second artificial bone component, or both, wherein said first artificial bone component geometrically mimics a pelvis comprising a right and left side, said pelvis comprising a right and left acetabulum-shaped cavity defined on each of said right and left side;

wherein said second artificial bone component geometrically mimics a left femur bone comprising a ball shaped structure defined on said proximal end of said second artificial bone component and at least one left artificial muscle component cooperative with both said pelvis and said second artificial bone component such that said left artificial muscle component urges said ball shaped structure of said second artificial bone component to be held within said left acetabulum shaped cavity; and further comprising a third artificial bone component comprising a proximal end and a distal end, said third artificial bone component geometrically mimics a right femur bone comprising a ball shaped structure defined on said proximal end of said third artificial bone component; and at least one right artificial muscle component cooperative with both said right said of said pelvis and said third artificial bone component such that said at least one right artificial muscle component urges said ball shaped structure of said third artificial bone component to be held within said right acetabulum shaped cavity.

4. An artificial joint replica model configured to geometrically mimic a human or nonhuman animal joint, said model comprising:

a first artificial bone component comprising a proximal end and a distal end and comprised of a tissue analog material simulating at least one physical characteristic of living bone;

a second artificial bone component comprising a proximal end and a distal end and comprised of a tissue analog material simulating at least one physical characteristic of living bone; wherein said distal end of said first artificial bone component and said proximal end of said second artificial bone component geometrically mimic the ends of two bones that form a human or nonhuman animal joint; and an artificial cartilage layer comprised of an analog material simulating at least one physical characteristic of cartilage and disposed onto at least a portion of said distal end of said first artificial bone component or said proximal end of said second artificial bone component, or both, wherein said first artificial bone component geometrically mimics a human scapula comprising a distal end and proximal end, said first artificial bone component comprising a cavity is defined on said distal end of said first artificial bone component;

wherein said second artificial bone component geometrically mimics a humerus comprising a proximal end and a distal end; said second artificial bone component comprising a ball shaped structure defined on said proximal end of said second artificial bone component;

further comprising a third artificial bone component that geometrically mimics a clavicle comprising a proximal and distal end;

at least one artificial ligament component cooperative with said proximal end of said first artificial bone component and said distal end of said third artificial bone component; and at least one muscle component cooperative with both said first artificial bone component and said second artificial bone component such that said ball shaped structure is urged toward said cavity.

5. The artificial joint replica model of claim 1, wherein said at least one artificial muscle component is cooperative with said first and second artificial bone components through intervening artificial tendon components at said first end and said second end of said at least one artificial muscle component.

* * * * *